United States Patent
Norton et al.

(10) Patent No.: US 10,487,863 B2
(45) Date of Patent: Nov. 26, 2019

(54) CASTELLATED JOINT FOR IMPROVED ADHESIVE COVERAGE WHEN USING MECHANICAL FIXINGS AND ADHESIVE IN ONE JOINT

(71) Applicant: Ford Global Technologies, LLC, Dearborn, MI (US)

(72) Inventors: Thomas Norton, Ann Arbor, MI (US); Anthony J. Grima, South Rockwood, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 428 days.

(21) Appl. No.: 15/436,063

(22) Filed: Feb. 17, 2017

(65) Prior Publication Data
US 2018/0238363 A1    Aug. 23, 2018

(51) Int. Cl.
*F16B 5/04* (2006.01)
*F16B 11/00* (2006.01)
*B29C 65/48* (2006.01)

(52) U.S. Cl.
CPC .............. *F16B 5/04* (2013.01); *F16B 11/006* (2013.01); *B29C 65/48* (2013.01)

(58) Field of Classification Search
CPC ........ F16B 5/04; F16B 5/0088; F16B 11/006; F16B 19/086; B29C 65/48; B29C 65/60; B29C 65/7802; B29C 65/782
See application file for complete search history.

(56) References Cited

U.S. PATENT DOCUMENTS

| | | | |
|---|---|---|---|
| 6,083,604 A * | 7/2000 | Haraga | F16B 5/00 428/132 |
| 7,560,003 B2 | 7/2009 | Naughton et al. | |
| 7,716,804 B2 | 5/2010 | Berndl et al. | |
| 8,794,894 B2 * | 8/2014 | Lee | F16B 19/086 411/448 |
| 9,719,538 B2 * | 8/2017 | Sugimoto | F16B 5/08 |
| 9,759,249 B2 * | 9/2017 | Kurokawa | F16B 5/045 |
| 9,950,748 B2 * | 4/2018 | Ikeda | B60K 1/04 |
| 2008/0149256 A1 | 6/2008 | Wang et al. | |

FOREIGN PATENT DOCUMENTS

| | | | |
|---|---|---|---|
| DE | 102012109046 A1 * | 4/2014 | ............ B21D 28/26 |
| GB | 2428077 | 1/2007 | |
| JP | 2006170232 | 6/2006 | |
| JP | 2007321880 | 12/2007 | |

* cited by examiner

*Primary Examiner* — Jonathan P Masinick
(74) *Attorney, Agent, or Firm* — Burris Law, PLLC

(57) ABSTRACT

An assembly is provided that includes a castellated upper substrate defining a plurality of alternating troughs and ridges. A lower substrate is disposed adjacent the upper castellated substrate, and an adhesive material is disposed between the castellated upper substrate and the lower substrate. A fastener extends through a trough of the castellated upper substrate, through the adhesive material, and into the lower substrate. A method of assembling the upper and lower substrates is also provided, which includes plastically deforming the castellated upper substrate to reduce an intake of air between the substrates.

18 Claims, 5 Drawing Sheets

CASTELLATED JOINT FOR IMPROVED ADHESIVE COVERAGE WHEN USING MECHANICAL FIXINGS AND ADHESIVE IN ONE JOINT

FIELD

The present disclosure relates generally to mechanical joints and more particularly to mechanical joints for use in applications where substrates are joined with an adhesive material therebetween, including mechanical joining using self-piercing rivets (SPRs).

BACKGROUND

The statements in this section merely provide background information related to the present disclosure and may not constitute prior art.

In the mechanical joining of substrates, for example in an automotive vehicle assembly process, substrates are joined to each other with an adhesive material along a joint and between the substrates. The adhesive material serves a number of functions, including providing an environmental seal, to increase the mechanical strength of the joint, and to compensate for part and assembly tolerances. In addition to the adhesive material, mechanical fasteners/fixings are also used to secure the substrates to each other, wherein the mechanical fasteners penetrate the substrates and the adhesive material to provide the primary structural joint and its strength.

Referring to FIG. 1, one form of fasteners/fixings used to secure the substrates to each other is a self-piercing rivet (SPR). Installation of an SPR generally involves driving the SPR 10 into substrates 11, 12 to be joined with an SPR tool, which includes a punch 14 and a gun nose 15. A die 16 is also provided on an underside of the lower substrate 12, and an adhesive 17 is applied between the substrates 11, 12 prior to installation as shown in step A. During installation, the gun nose 15 and the die 16 are forced together in step B, (compressing the adhesive 17 to a thickness typically less than about 0.2 mm), and the punch 14 forces the SPR 10 down such that the SPR 10 pierces the upper substrate 11 and flares into the lower substrate 12 as shown in step C. As the SPR 10 is forced into the substrates 11/12, the substrates 11/12 are plastically deformed, which draws air into the joint as shown, which is undesirable since air voids in the adhesive 17 can weaken the joint and be a source for environmental corrosion and a water leak path. These air voids remain when multiple SPRs are installed.

This issue of air voids in the adhesive in SPR joints, among other mechanical joining issues, is addressed by the present disclosure.

SUMMARY

In one form of the present disclosure, an assembly is provided that comprises at least one castellated upper substrate defining a plurality of alternating troughs and ridges, at least one lower substrate disposed adjacent the upper substrate, an adhesive material disposed between the castellated upper substrate and the lower substrate, and at least one fastener extending through a trough of the castellated upper substrate, through the adhesive material, and into the lower substrate.

According to various forms of castellated upper substrate, a plurality of angled walls extend between the alternating troughs and ridges, and in one form, the angled walls define an angle that is a function of a thickness of the adhesive. Further, the ridges of the castellated upper substrate define a height that is a function of a thickness of the adhesive, and in one form the ridges define a controlled height along the castellated upper substrate. The troughs may also define a length that is shorter than a length of the ridges, and generally, the troughs and ridges are parallel to a joint geometry in one form of the present disclosure. The castellated upper substrate may be the same or a different material from the lower substrate. In one form, the fastener is a self-piercing rivet (SPR), and a vehicle, such as an automobile, is also provided by the present disclosure that includes the assembly as set forth herein.

In another form, a method of assembling an upper substrate to a lower substrate is provided that comprises the steps of forming the upper substrate with castellations, placing an adhesive on at least one of the substrates, positioning the substrates adjacent one another to establish an adhesive joint thickness, and installing a fastener through the upper substrate and into the lower substrate. The upper substrate is plastically deformed during installation of the fastener to reduce an intake of air between the substrates. In one form, the castellated upper substrate is formed by stamping. In another form, the fastener is installed using a self-piercing rivet (SPR) method and is installed through a trough of the castellations of the upper substrate.

In still another form of the present disclosure, a castellated substrate is provided for use in a vehicle assembly that defines a plurality of alternating troughs and ridges. Each of the troughs and ridges define a width, and each trough defines a height relative to a lower surface of each trough, wherein at least one of the widths and the trough height is a function of an adhesive joint thickness.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
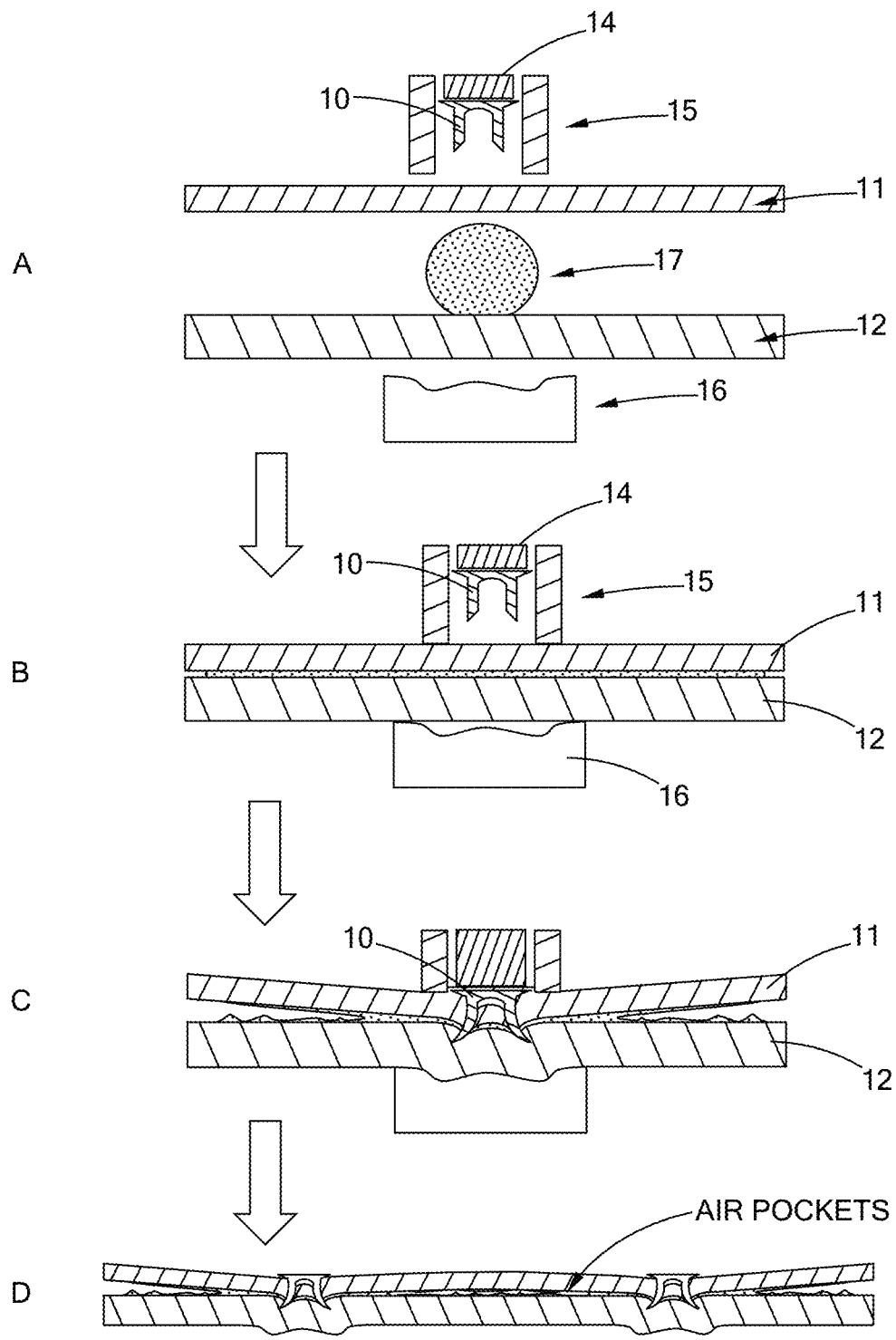
FIG. 1 is a series of cross-sectional views illustrating joining of two substrates having an adhesive therebetween with flow-drill screw (FDS) technology according to the prior art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2A:
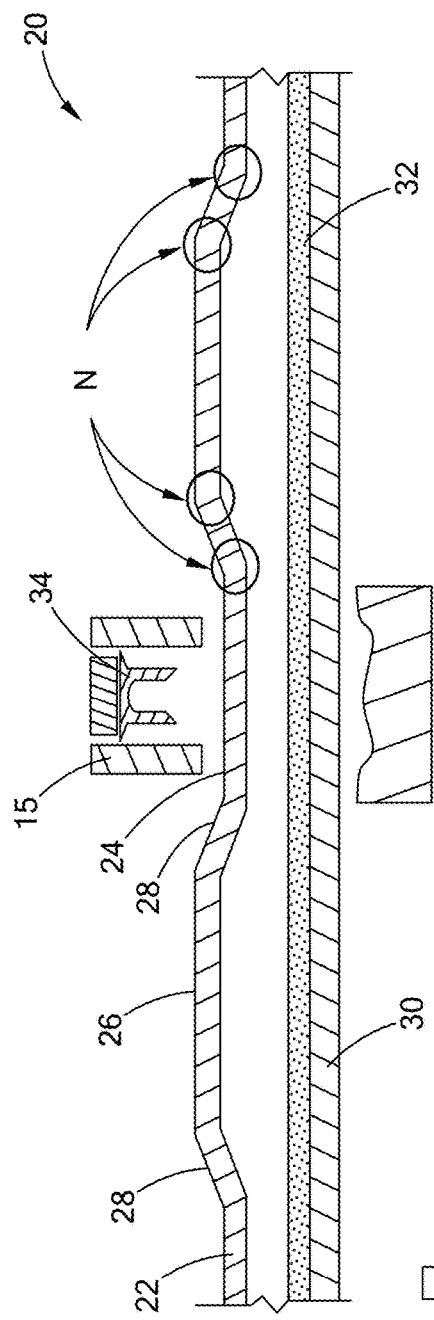
FIG. 2A is a cross-sectional view of an assembly having a castellated substrate according to the teachings of the present disclosure and prior to installation of an FDS.
Figure 2B:
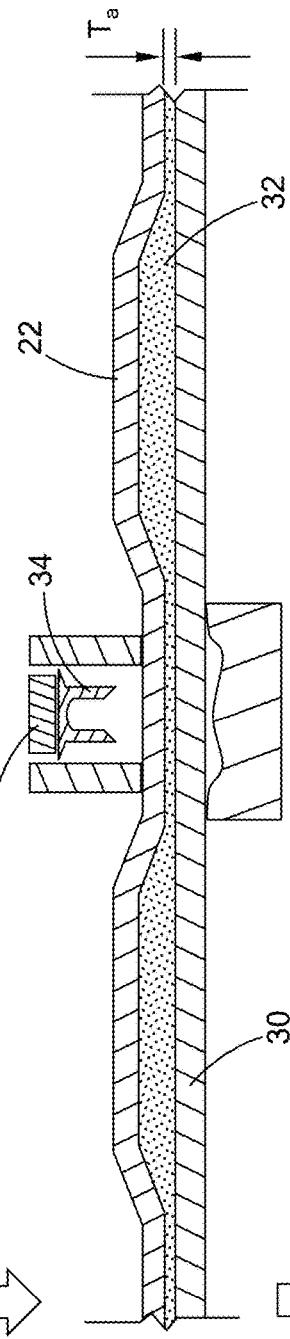
FIG. 2B is a cross-sectional view of the assembly of FIG. 2, wherein the castellated substrate and the lower substrate are brought together prior to installation of an FDS.
Figure 2C:
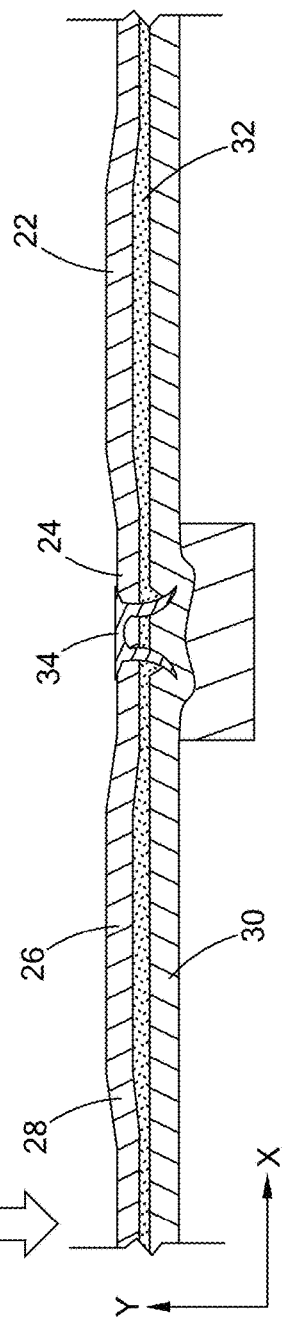
FIG. 2C is a cross-sectional view of the assembly of FIG. 1 after installation of an FDS and showing plastic deformation of the substrates according to the teachings of the present disclosure.

Referring to FIGS. 2A-2C, an assembly according to the teachings of the present disclosure is illustrated and generally indicated by reference numeral 20. The assembly 20 includes at least one castellated upper substrate 22 defining a plurality of alternating troughs 24 and ridges 26. A plurality of angled walls 28 extend between the alternating troughs 24 and ridges 26, thus creating a plurality of corners, or nodes "N" at the intersection of the angled walls 28 and the troughs 24 and ridges 26. These nodes N provide a degree of flexibility or degree of freedom (DOF) for the castellated upper substrate 22 upon assembly, as described in greater detail below, which inhibits or reduces an intake of air within a joint area of the assembly.

At least one lower substrate 30 is disposed adjacent the upper castellated substrate 22, and an adhesive material 32 is disposed between the castellated upper substrate 22 and the lower substrate 30. The adhesive material 32 may be in the form of a strip as shown, or it may take on any number of other forms, including the bead as shown in FIG. 1, among others, while remaining within the scope of the present disclosure.

To join the castellated upper substrate 22 to the lower substrate 30, a fastener 34, which in this form is a self-piercing rivet (SPR), is loaded into the gun nose 15 as shown in FIG. 2A prior to installation. As shown in FIG. 2B, the castellated upper substrate 22 and the lower substrate 30 are brought together, or pressed together with a predetermined amount of pressure, to form an adhesive joint thickness $T_a$. Next, the punch 14 forces the fastener 34 down such that it pierces the castellated upper substrate 22 and flares into the lower substrate 30 as shown in FIG. 2C. Accordingly, the fastener 34 extends through a trough 24 of the castellated upper substrate 22, through the adhesive material 32, and into the lower substrate 30. It should be understood that only one fastener 34 is shown for purposes of clarity, and thus a plurality of fasteners 34 are often employed and thus contemplated by the teachings of the present disclosure. Therefore, at least one fastener 34 is used according to the teachings of the present disclosure. Alternately, in another form, the castellated upper substrate 22 is used without a physical fastener, for example in such joining methods as spot-welding. Further, the fastener 34 may be an SPR as disclosed herein, or alternately a flow-drill screw (FDS) or a single-sided rivet, among others, while remaining within the scope of the present disclosure.

More specifically, as the fastener 34 is forced through the castellated upper substrate 22 and into the lower substrate 30, both of the substrates 22/30 are plastically deformed. Advantageously, the troughs 24, ridges 26, and angled walls 28 are configured to compensate for the plastic deformation by using the DOF of the nodes N to essentially provide a hinged joint that allows the ridges 26 to deform laterally (+/−X) and downwardly (−Y) to apply a more constant pressure to the adhesive material 32. The adhesive material 32 also flows into the area under the ridges 26 of the castellated upper substrate 22 as shown in FIG. 2C. Therefore, combined with the "hinged" plastic deformation of the castellated upper substrate 22, the flow of the adhesive material 32 inhibits air from entering the joint.

As used herein, the term "joint" should be construed to mean the joined interface between the castellated upper substrate 22 and the lower substrate 30, including the adhesive material 32 and at least one fastener 34. Further, the "joint geometry" should be construed to mean the geometric profile of the joint along the interfaces between the castellated upper substrate 22 and the lower substrate 30, which in this form are illustrated as being planar. It should be understood that other joint geometries, both 2-dimensional (2D) and 3-dimensional (3D), such as by way of example, arcuate, trapezoidal, among other polygonal shapes, and any B-spline/surface (2D/3D) should be construed as falling within the scope of the present disclosure.

Figure 3:
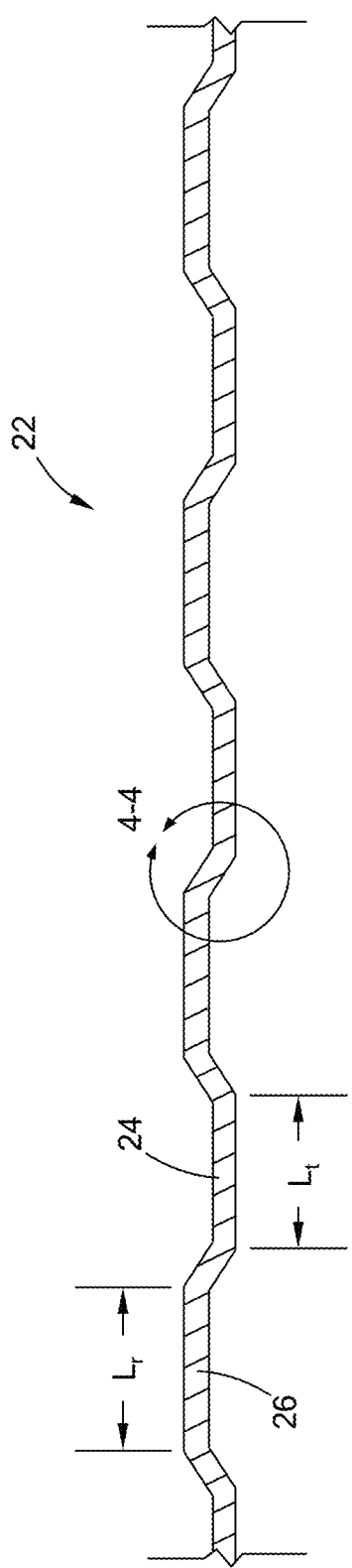
FIG. 3 is a cross-sectional view of a castellated substrate according to the teachings of the present disclosure.
Figure 4:
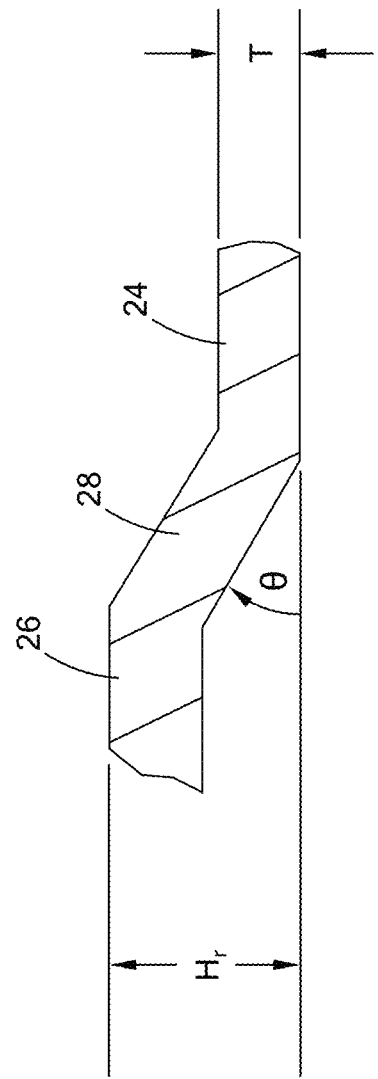
FIG. 4 is a detail view of a portion of the castellated substrate of FIG. 3.

Referring now to FIGS. 3 and 4, the angled walls 28 define an angle θ that is a function of a thickness of the adhesive 32. For example, in one form, the angle θ is about 45°, or a ridge height $H_r$ of about 2.5 mm with a thickness T of the castellated upper substrate 22 of about 2 mm. The adhesive thickness $T_a$ in this form is about 0.5 mm. In another form, the angle θ is about 30°, or a ridge height $H_r$ of about 3.75 mm with a thickness T of the castellated upper substrate 22 of about 1 mm. In this second example, the adhesive thickness $T_a$ is about 2.75 mm. It should be understood that these joint configurations are merely exemplary and should not be construed as limiting the scope of the present disclosure.

Figure 5:
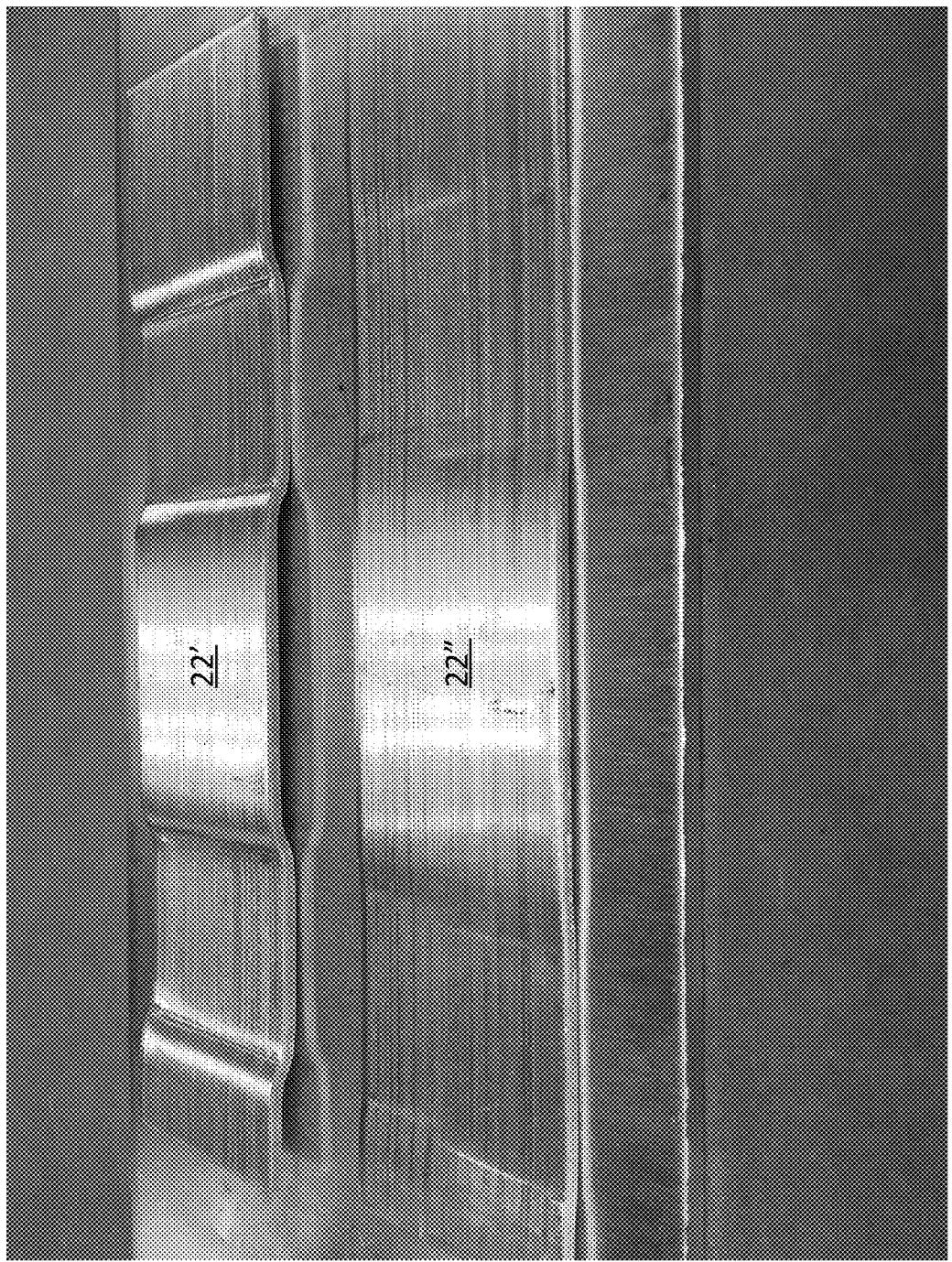
FIG. 5 is a photograph of two forms of a castellated substrate according to the teachings of the present disclosure.

An example of various geometries and ridge heights $H_r$ are shown in FIG. 5. These castellated substrates 22'/22" are test coupons that were fabricated and tested as illustrated and described in greater detail below. Their respective ridge heights $H_r$ are 2.75 mm (22') and 0.75 mm (22"), which are merely exemplary. Further, these castellated substrates 22' and 22" are merely sample geometries to demonstrate the castellation features. As such, a wide variety of 2-dimensional (2D) and 3-dimensional (3D) substrate geometries may be formed while remaining within the scope of the present disclosure.

Figure 6B:
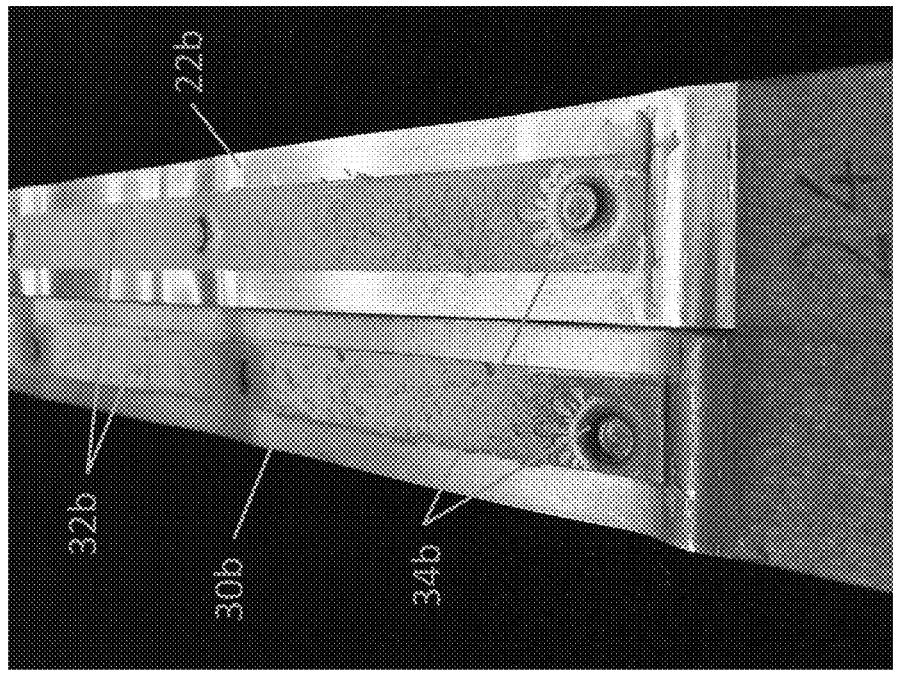
FIG. 6B is a photograph illustrating test coupons with castellated substrates after assembly and disassembly.
Figure 6A:
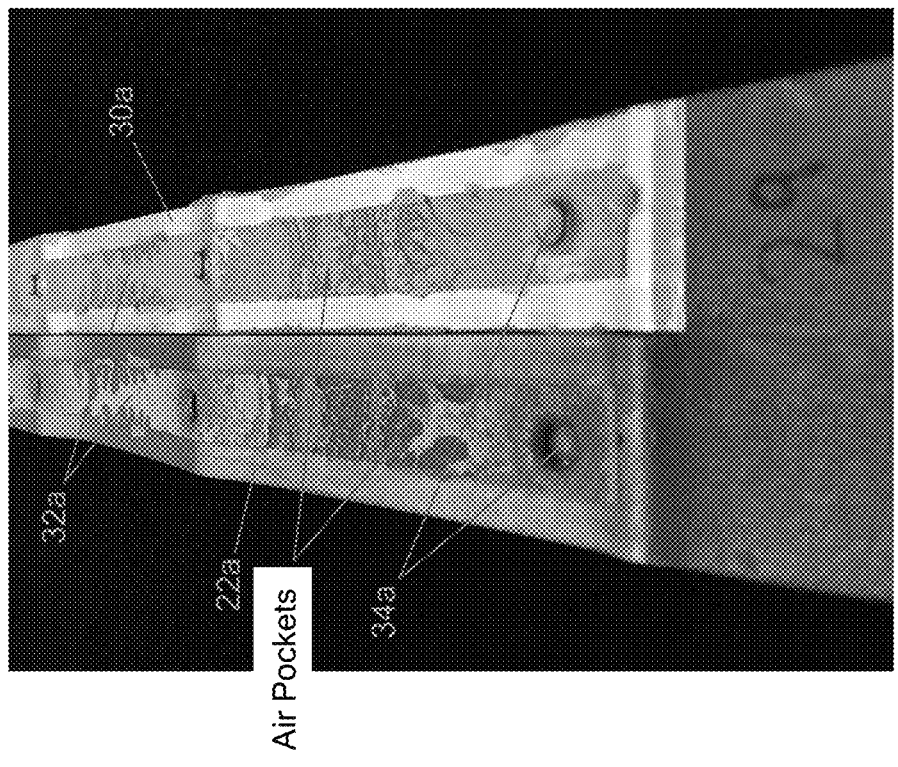
FIG. 6A is a photograph illustrating test coupons without castellated substrates (or with flat substrates for both upper and lower) after assembly and disassembly.

Referring now to FIGS. 6A and 6B, test coupons without the castellated geometry (FIG. 6A) and with the castellated geometry (FIG. 6B) are illustrated. The test coupons in FIG. 6A include a lower substrate 30a, an upper substrate 22a, and an adhesive material 32a line after installation of an SPR 34a and assembly (plastic deformation), followed by disassembly of the joint. Similarly, the test coupons in FIG. 6B include a lower substrate 30b, an upper substrate 22b, and an adhesive material 32b after installation of an SPR 34b and assembly (plastic deformation), followed by disassembly of the joint. Evidence of air pockets is clearly shown in the test coupons in FIG. 6A, whereas the test coupons in FIG. 6B do not show evidence of such air pockets. The lack of air pockets is evident by the relatively continuous strips of adhesive material 32b and a relatively constant thickness, versus the discontinuities of the adhesive material 32a in FIG. 6A, which are indicative of air pockets. Accordingly, tests show that the castellated geometry provides a reduced intake of air between the substrates 22b/30b during installation of an SPR when the substrates 22b/30b are plastically deformed.

In another form, the ridge $H_r$ is a function of the thickness of the adhesive, $T_a$. The ridges 26 may define a controlled ridge height $H_r$ along the castellated upper substrate, which in the illustrated form is constant. It should be understood, therefore, that a variety of ridge heights $H_r$ may be used along the joint while remaining within the scope of the present disclosure.

In still another form, the troughs 24 define a length $L_t$ that is shorter than a length $L_r$ of the ridges 26. Generally, the troughs 24 and ridges 26 are parallel to the joint geometry as shown, however, the troughs 24 and ridges 26 may deviate from this configuration in order to compensate for other structures within the assembly or for a variable adhesive thickness $T_a$ along the joint, depending on application requirements.

The castellated upper substrate 22 may be the same or a different material from the lower substrate 30. For example, the castellated upper substrate 22 may be aluminum, while the lower substrate 30 is steel. In another example, the castellated upper substrate may be aluminum, while the lower substrate 30 is carbon fiber composite. Of course, other materials may be employed while remaining within the scope of the present disclosure. In one form, the castellated upper substrate 22 is formed by a stamping process, although other processes may be used while remaining within the scope of the present disclosure. These processes may include, by way of example, machining, molding, or 3D-printing, among others. Further, the present disclosure includes a vehicle comprising the assembly as illustrated and described herein.

Accordingly, the present disclosure provides an innovative structure to compensate for plastic deformation of substrates that results from the installation of self-piercing fasteners such SPRs. The invention is particularly useful when joining substrates in high-volume automotive assembly processes. Assembly of structural components employing the unique features of the castellated upper substrate illustrated and described herein allows for improved integrity of structural joints.

It should also be understood that the terms "upper" and "lower" relative to the substrates is merely exemplary in order to demonstrate an assembly having the innovative castellated substrate according to the teachings of the present disclosure. Accordingly, the castellated substrate may be an upper component, a lower component, or other relative assembly position while remaining within the scope of the claimed invention.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An assembly comprising:
    at least one castellated upper substrate defining a plurality of alternating troughs and ridges;
    at least one lower substrate disposed adjacent the upper castellated substrate;
    at least one fastener extending through a trough of the castellated upper substrate, through the adhesive material, and into the lower substrate; and
    an adhesive material disposed between the castellated upper substrate and the lower substrate,
    wherein the at least one castellated upper substrate and the at least one lower substrate are plastically deformed during installation of the at least one fastener such that the plurality of ridges deform laterally and downwardly to apply pressure to the adhesive material.

2. The assembly according to claim 1, wherein the at least one fastener is a self-piercing rivet (SPR).

3. The assembly according to claim 1 further comprising a plurality of angled walls extending between the alternating troughs and ridges.

4. The assembly according to claim 3, wherein the angled walls define an angle that is a function of a thickness of the adhesive.

5. The assembly according to claim 1, wherein the ridges of the castellated upper substrate define a height that is a function of a thickness of the adhesive.

6. The assembly according to claim 1, wherein the troughs define a length that is shorter than a length of the ridges.

7. The assembly according to claim 1, wherein the troughs are parallel to a joint geometry.

8. The assembly according to claim 1, wherein the ridges are parallel to a joint geometry.

9. The assembly according to claim 1, wherein the castellated upper substrate is a different material from the lower substrate.

10. A vehicle comprising the assembly of claim 1.

11. A method of assembling an upper substrate to a lower substrate with a fastener, the method comprising:
    placing an adhesive on at least one of the substrates;
    positioning the substrates adjacent one another to establish an adhesive joint thickness; and
    securing the upper substrate to the lower substrate with the fastener,
    wherein the upper substrate defines a plurality of alternating troughs and ridges, and the upper substrate and the lower substrate are plastically deformed during installation of the fastener such that the plurality of ridges deform laterally and downwardly to apply pressure to the adhesive.

12. The method according to claim 11, wherein the upper substrate is formed by stamping.

13. The method according to claim 11, wherein the fastener is installed using a self-piercing rivet (SPR) method.

14. A castellated substrate for use in a vehicle assembly defining a plurality of alternating troughs and ridges, each of the troughs and ridges defining a width and each trough defining a height relative to a lower surface of each trough, wherein the castellated substrate is plastically deformed during installation of at least one fastener such that the plurality of ridges deform laterally and downwardly to apply pressure to an adhesive material disposed between the castellated substrate and an adjacent substrate.

15. The castellated substrate according to claim 14 further comprising a plurality of angled walls extending between the alternating troughs and ridges.

16. The castellated substrate according to claim 14, wherein the troughs are parallel to a joint geometry.

17. The castellated substrate according to claim 14, wherein the width of the troughs and ridges is constant along a length of the castellated substrate.

18. The castellated substrate according to claim 14, wherein the height of each trough is constant along a length of the castellated substrate.

* * * * *